United States Patent Office 2,898,353
Patented Aug. 4, 1959

2,898,353

PREPARATION OF AMIDES

Heinz Schulze, Cincinnati, Ohio, assignor to General Aniline & Film Corporation, New York, N.Y., a corporation of Delaware No Drawing. Application July 29, 1957
Serial No. 674,575

10 Claims. (Cl. 260—404)

This invention relates to a novel method for the preparation of carboxylic acid amides. More particularly, the present invention is directed to a process for the production of amides by the acylation of primary or secondary amines by means of the mixed anhydrides of boric acid and the organic acid whose amide it is desired to produce.

The preparation of carboxylic acid amides plays an important role in organic synthesis and numerous methods of preparation are known, a number of them being reviewed in Wagner-Zook, Synthetic Organic Chemistry, page 565. One of the most commonly used processes for the preparation of amides involves the interaction of an organic acid halide, usually the chloride, with a primary or secondary amine. In this process hydrochloric acid is formed and care must be taken that it can escape immediately or is rendered harmless by suitable neutralizing agents. This is particularly important with acid sensitive compounds. The hydrochloric acid which is liberated also gives rise to substantial equipment corrosion problems. Another method for producing amides involves the interaction of an organic acid anhydride with a primary or secondary amine. While this process avoids certain of the difficulties encountered in the reaction of acid chlorides with amines, there are certain inherent disadvantages associated with it. In particular, along with the acyl amide, there is formed an equal molecular amount of the acid from the anhydride. This method is, therefore, less desirable with more expensive or higher molecular weight acids. To a certain extent the losses of the acids can be minimized by use of mixed anhydrides in which the second acyl residue is derived from a less expensive, low molecular weight, acid. While acyl amides of both acids are formed in this process, they are formed in different proportions (see Wieland et al. and Annalen, 572, 190; 579, 97 (1953)). Thus the formation of the undesired acyl amide can be suppressed by proper choice of the second acyl residue. Still a further process for producing acyl amides has been suggested by L. Malatesta, Gazetta Chimica Italiana, 78, 753 (1948), who found that the mixed anhydride of silicic and acetic acid is a powerful acetylating agent. This process, however, suffers from the inconvenience that gelatinous silicon dioxide is formed during the reaction, the separation of which may be difficult.

I have now found that organic carboxylic amides may be formed by the reaction of a primary or secondary amine with a mixed anhydride of boric acid and an organic carboxylic acid. This reaction appears to be the general reaction and in this reaction with amines the mixed anhydrides of carboxylic acids and boric acid form, in addition to the desired carboxylic acid amide, only the extremely weak boric acid so that the addition of acid binding or neutralizing agents during or immediately after the reaction is not necessary. For certain purposes such as preparation of surface active agents, the boric acid may be permitted to remain in the product. However, where it is desired to separate the amide from the boric acid, the removal of the boric acid from the reaction mixture is usually readily effected by simple procedures such as by dissolution in water, by distillation with steam, by extraction under nearly neutral conditions with aqueous sodium bicarbonate solution containing some glycerol, by evaporation of the boric acid with alcohol or other procedures.

As stated above, the reaction of the present invention is a general reaction, and as explained in greater detail below, the present process may be employed for the production of a wide variety of amides. However, as with many other acylating agents, the acylation employing the mixed anhydride of boric acid and an organic carboxylic acid in accordance with the invention, proceeds better the more strongly basic the amine is which is used and the less sterically hindered it is. However, as indicated by Example 5 below, the process is operative with even so weakly basic an amine as 3-amino pyrazolone. It will also be apparent that the amine employed should be free of substituents which will react with the mixed boric-carboxylic anhydride, as otherwise a mixture of products will be obtained due to secondary reactions. The course of the reaction and the type of materials which may most advantageously be employed in practicing the present invention are represented by the following equation:

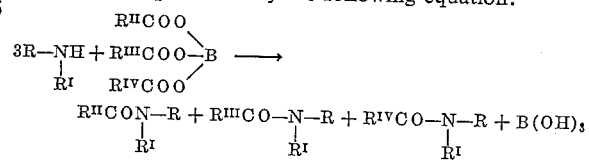

$$\text{R}^{II}\text{CON}\!-\!\text{R} + \text{R}^{III}\text{CO}\!-\!\text{N}\!-\!\text{R} + \text{R}^{IV}\text{CO}\!-\!\text{N}\!-\!\text{R} + \text{B(OH)}_3$$
$$\quad\ \ |\qquad\qquad\ \ |\qquad\qquad\quad\ |$$
$$\quad\ \text{R}^{I}\qquad\qquad\text{R}^{I}\qquad\qquad\ \ \text{R}^{I}$$

wherein R represents an alkyl, aryl, aralkyl or heterocyclic (e.g. pyrazolone) group, $R^{I}$ represents hydrogen or an alkyl, or aralkyl group or R and $R^{I}$ together may represent the atoms necessary to form with N a secondary heterocyclic amine, and $R^{II}$ and $R^{III}$ and $R^{IV}$ represent the residue of the same or different aliphatic or aromatic carboxylic acids.

It is accordingly an object of the invention to produce carboxylic acid amides by reaction of primary or secondary aliphatic, aromatic or heterocyclic amines with mixed anhydrides of aliphatic or aromatic carboxylic acids with boric acids.

It is a further object of the invention to form carboxylic acid amides of aminophenols by reaction with said mixed boric acid-carboxylic acid anhydrides.

It is a further object of the invention to provide a novel method for producing surface active agents, which are carboxylic acid amides of higher fatty acids with amines such as N-methyltaurine. Other and further objects will be apparent as the present description progresses.

Briefly stated in the process of the present invention carboxylic acid amides are prepared by reacting amines with said mixed carboxylic acid-boric anhydrides at ordinary or elevated temperatures, usually in indifferent anhydrous solvents like benzene, ethylacetate, ethylene dichloride, pyridine, etc., in which the mixed anhydrides have at least a limited solubility. Suitable methods for the preparation of the mixed carboxylic acids-boric acids anhydrides, employed as acylating agents pursuant to the present invention, are known in the art. Such mixed anhydrides were apparently prepared first by Pictet, Berichte, 36, 2219 (1903), who also gave the most essential methods of preparation of said anhydrides; namely (1) From boric acid and carboxylic acid anhydrides (see also Dimroth, Annalen, 446, 97 (1926); Berichte 54, 3029 (1921), and Cook, Ilett, Saunders and Stacey, J. Chem. Soc. 1950, 3125);

(2) From boric acid and carboxylic acid chlorides (see also Brooks, J.A.C.S., 34, 492 (1912)).

Among other Pictet prepared mixed anhydrides with boric acid of acetic acid+, benzoic acid+, succinic acid+ and stearic acid.

As examples of carboxylic acids whose mixed anhydrides with boric acid may be used in practicing the present invention may be mentioned such aliphatic acids as acetic acid, propionic acid, butyric acid, succinic acid, adipic acid, isovaleric acid, caproic acid, caprylic acid, capric acid, lauric acid, myristic acid, palmitic acid, stearic acid, oleic acid, ricinoleic acid, linoleic acid, linolenic acid, and mixtures of the same such as the mixed acids obtained by hydrolysis of natural fats and waxes of vegetable or animal origin, and such aromatic carboxylic acids as benzoic acid, o, m or p toluic acid, chlorobenzoic acid, nitrobenzoic acids, anisic acid, and naphthoic acid.

As examples of amines which may be acylated by the mixed carboxylic acid-boric acid anhydrides in the present invention may be mentioned such aliphatic primary and secondary amines as methyl amine, ethylamine, propylamines, butylamines, amylamines, hexylamine, nonylamine, lauryl amine, stearylamine, oleylamine, abietinylamine, dimethylamine, diethylamine, dipropylamine, diisobutylamine, diamylamine, allylamine, diallylamine, diethanolamine, ethylenediamine, hexamethylenediamine, cyclohexylamine, benzylamine, phenethylamine, taurine, N-methyltaurine and sarcosine, and such aromatic amines as aniline, N-methylaniline, N-ethylaniline, o, m, and p-toluidine, o, m, and p-nitroaniline, phenylenediamines, o, m, and p-anisidine, phenetidine, chloroanilines, alpha or beta naphthylamine, amino phenols, amino naphthols and such heterocyclic amines as morpholine, piperidine and pyrrolidine.

The details of the present invention will be apparent to those skilled in the art in consideration of the following specific examples.

Example 1

10.7 g. p-toluidine were dissolved in 50 ml. dry toluene, 7 g. boron triacetate (sample from "Trona" industrial and agricultural chemicals) M.P. 147–150° C. added and the slightly turbid solution refluxed for three hours. A precipitate was formed in course of the reaction. Then all volatile parts were removed by steam distillation. The residue was diluted with so much boiling water that all went into solution. Overall volume was approximately one liter. The solution was treated with charcoal and filtered. On cooling 12.3 g. acetyl-p-toluidine crystallized out, M.P. 152–153° C.

Example 2

100 ml. toluene+15.2 g. anisic acid were refluxed with moisture trap until dry. Then 7 g. boron triacetate were added to the boiling solution. Within 105 minutes 54 ml. solvent was distilled off over a Vigreux column. A glassy precipitate formed in the reaction flask. After addition of 11 ml. benzylamine the mixture was refluxed overnight. A white precipitate had then formed. After steam distillation and recrystallization of the solid residue from 200 ml. alcohol, 6.2 g. p-methoxy benzoyl benzylamide, M.P. 133–134° C. were collected.

Example 3

10 g. boron triacetate were suspended in 50 ml. dry benzene. 11 ml. N-methylaniline were added. A precipitate was formed on warming. After refluxing for two hours, the mixture was worked up and a product melting at 101° was isolated which gave no depression of the melting point with pure N-acetyl-N-methylaniline, M.P. 101° C.

Example 4

100 ml. toluene and 10.9 g. 3-aminophenol were refluxed with moisture trap until dry. 8.36 g. boron triacetate were added and two hours refluxed with stirring. After steam distillation and cooling the solution in ice, greenish white crystals were formed which after recrystallization from benzene melted at 148–149° C. 3-acetylaminophenol is reported to melt at 148–149°.

Example 5

21 g. boron triacetate were added to 17.5 g. 3-amino-1-phenyl pyrazolone in 80 ml. anhydrous pyridine and 15 ml. anhydrous benzene and the mixture refluxed for two hours. After cooling, 50 ml. methanol were added which dissolves most of the precipitate formed during the reaction. Then, the whole mixture is evaporated to dryness and redissolved in 400 ml. boiling alcohol. A small residue remains and is filtered hot. On cooling 11.7 g. 3-acetyl amino-1-phenyl pyrazolone crystallizes out. The product is still yellow but melts at 221–222° C. It does not give a depression of melting point with 3-acetylamino-1-phenyl-pyrazolone whereas with 3-amino pyrazolone the depression of a mixed melting point amounts to more than 20° C. The reaction can also be run in anhydrous acetic acid.

Example 6

Into a one liter flask equipped with an agitator, thermometer and condenser set downward for distillation there was charged 66.7 grams (0.664 mole) of acetic anhydride, and 11.0 grams (0.178 mole) of boric acid and the mixture warmed until all was in solution. When no more undissolved solids remained, indicating the formation of boron triacetate, there is added 155 grams (0.534 mole) of commercial stearic acid and the mixture warmed to 100° C. for two hours. The acetic acid formed and any excess acetic anhydride were then distilled off under reduced pressure. In several experiments the total weight or distillate varied from 70 to 80 grams.

To the thus obtained crude boric tristearate there is then added 57.0 grams (0.534 mole) of sodium salt of anhydrous-N-methyltaurine. The mixture heated at 150° C. At the end of about 20 hours the reaction mixture analyzed (methylene blue analysis) 50 to 60% of sodium salt of stearoyl N-methyltaurine. This reaction mixture when neutralized with caustic soda was an excellent detergent product which foamed freely in water, and exhibited excellent detergent properties. No purification of the reaction mixture was necessary since for many detergent purposes the presence of stearic acid soap and borax was not objectionable.

In a similar manner, valuable surface active agents were obtained by the procedure above described but was repeated using in place of the N-methyltaurine equivalent molar amounts of other N-alkyltaurines such as N-ethyltaurine and N-cyclohexyltaurine or equivalent molar amounts of such monocarboxylic acids as Sarcosine (N-methylglycine) and other N lower alkyl glycines. Surface active agents useful as detergents were also obtained when the foregoing procedure was repeated but using in place of stearic acid other higher fatty acids e.g. palmitic and mixtures of fatty acids such as mixed coconut oil fatty acids and mixed tallow fatty acids.

Example 7

Crude boron tristearate prepared by the procedure of Example 6 was reacted with 57.0% of sodium N-methyltaurine at a temperature of 100° C. At the end of one hour a sample withdrawn contained 8.7% of stearic acid N-methyltauride by methylene blue analysis (analytical method described in Nature, 160, 759 (1947), and Trans. Faraday Society, 44, 226–239 (1948)). At the end of three hours the content of stearic N-methyltauride was 9.3% and at the end of 20 hours 12.2%. This mixture neutralized with caustic soda was an effective detergent.

As a control a mixture of 55 grams commercial stearic acid, 11 grams of boric acid and 57.0 grams of sodium N-methyltaurine were heated 20 hours at 100° C. to give a reaction mixture containing only 2.3% stearic acid N-methyltaurine sodium salt by the same analysis.

I claim:

1. The method of producing carboxylic acid amides which comprises reacting a mixed anhydride of boric acid and of an organic carboxylic acid with an amine selected from the group consisting of primary and secondary amines.

2. The method as defined in claim 1 wherein the mixed anhydride of boric acid and an organic carboxylic acid specified, is the mixed anhydride of boric acid and a fatty acid.

3. The method as defined in claim 2 wherein the amine specified is an aromatic amine of the benzene series and is selected from the group consisting of primary and secondary amines.

4. The method as defined in claim 2 wherein the amine specified is an amino-phenol.

5. The method of producing acetyl amino phenols which comprises treating a mixture of boron triacetate and an aminophenol.

6. The method of producing surface active agents comprising a higher fatty acid and an amino acid selected from the group consisting of primary and secondary amino alkane sulfonic and carboxylic acids which comprises heating a mixture of a mixed anhydride of boric acid and a higher fatty acid, including mixtures of higher fatty acids, with an amino acid selected from the group consisting of primary and secondary amino alkane sulfonic and carboxylic acids.

7. The method as defined in claim 6 wherein the amino acid specified is an N lower alkyl-taurine.

8. The method as defined in claim 7 wherein the N lower alkyl taurine specified is N-methyl taurine.

9. The method as defined in claim 6 wherein the amino acid specified is an N lower alkyl glycine.

10. The method as defined in claim 9 wherein the N lower alkyl glycine specified is sarcosine.

References Cited in the file of this patent

UNITED STATES PATENTS 2,606,915     Garbo _____ Aug. 12, 1952

OTHER REFERENCES

Richter: Textbook of Organic Chemistry, 1938, edition, p. 183, John Wiley & Sons, New York.